United States Patent
Bossio

(10) Patent No.: US 6,950,301 B2
(45) Date of Patent: Sep. 27, 2005

(54) ALIGNMENT DOCKING SYSTEM

(75) Inventor: Michael Len Bossio, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 160 days.

(21) Appl. No.: 10/627,152

(22) Filed: Jul. 24, 2003

(65) Prior Publication Data

US 2005/0018389 A1 Jan. 27, 2005

(51) Int. Cl.[7] .................................................. H05K 5/00
(52) U.S. Cl. ...................................... 361/679; 361/727
(58) Field of Search ................................ 361/679, 683, 361/727, 748, 686

(56) References Cited

U.S. PATENT DOCUMENTS

| | | | |
|---|---|---|---|
| 3,853,379 A | 12/1974 | Goodman et al. ..... | 339/75 MP |
| 5,055,061 A | 10/1991 | Lichtenwalter ............. | 439/377 |
| 5,113,317 A | 5/1992 | Howe ......................... | 361/413 |
| 5,162,979 A | 11/1992 | Anzelone et al. ........... | 361/415 |
| 5,530,624 A | 6/1996 | Noon ........................... | 361/802 |
| 5,680,296 A | 10/1997 | Hileman et al. ............. | 361/802 |
| 5,751,551 A | 5/1998 | Hileman et al. ............. | 361/753 |
| 5,815,377 A | 9/1998 | Lund et al. ................. | 361/802 |
| 5,860,828 A | 1/1999 | Anderson et al. ............ | 439/377 |
| 6,021,049 A | 2/2000 | Thompson et al. .......... | 361/759 |
| 6,088,221 A * | 7/2000 | Bolognia ..................... | 361/685 |
| 6,166,917 A | 12/2000 | Anderson ................... | 361/756 |
| 6,198,633 B1 | 3/2001 | Lehman et al. ............. | 361/756 |
| 6,205,700 B1 | 3/2001 | Rigby et al. .................... | 43/79 |

OTHER PUBLICATIONS

Dimmick, R.F., et al., "Packaging of Printed Circuit Cards", IBM Technical Disclosure Bulletin, vol. 38, No. 2, Feb. 1995.

* cited by examiner

*Primary Examiner*—Yean-Hsi Chang
(74) *Attorney, Agent, or Firm*—Randall J. Bluestone; Harrington & Smith, LLP

(57) ABSTRACT

A system for connecting a first electrical connector on a printed circuit card with a second electrical connector. The system includes a support member having the printed circuit board connected thereto; a movement device allowing the support member to move in a first direction relative to the second connector; and a float connection between the movement device and the support member allowing the support member to move in a second direction relative to the second connector. The second direction is angled relative to the first direction. The float connection allows the first connector to align with the second connector as the support member is moved in the first direction and the first and second connectors are being connected to each other.

20 Claims, 4 Drawing Sheets

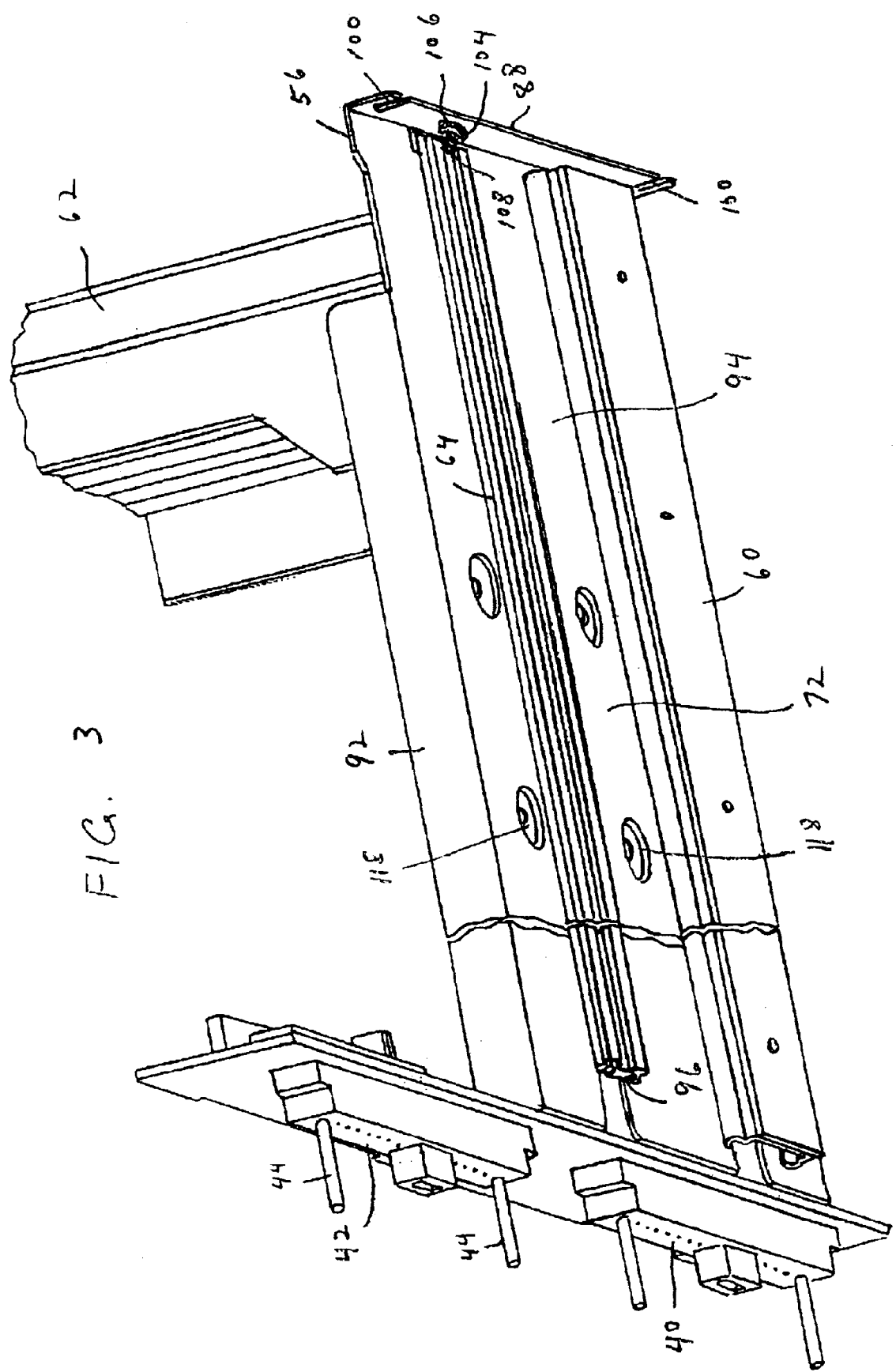

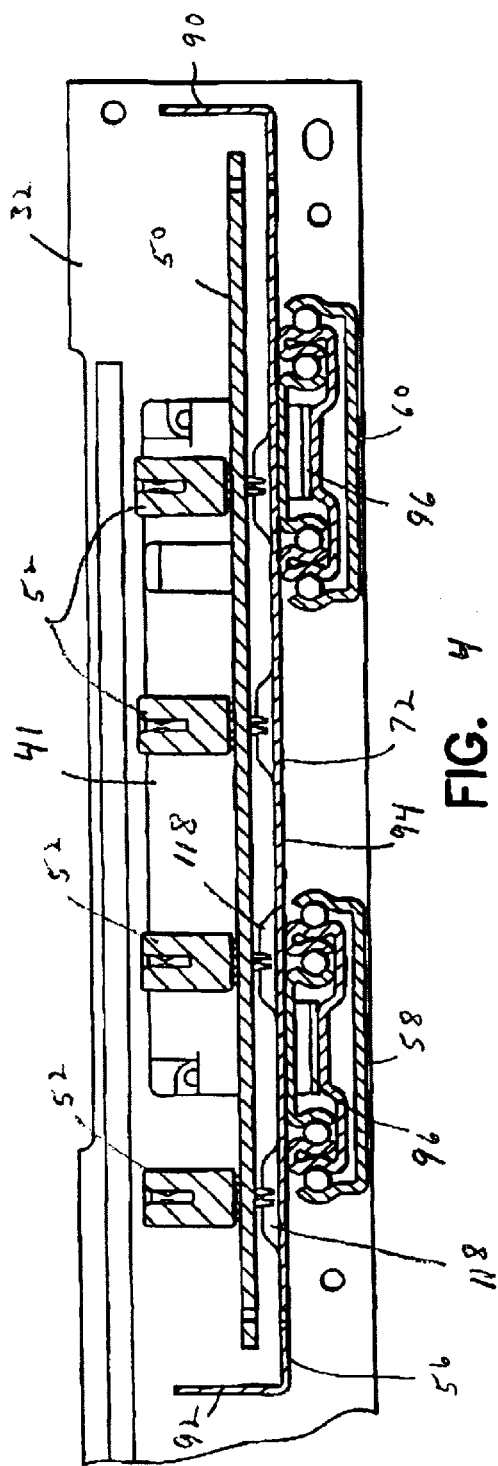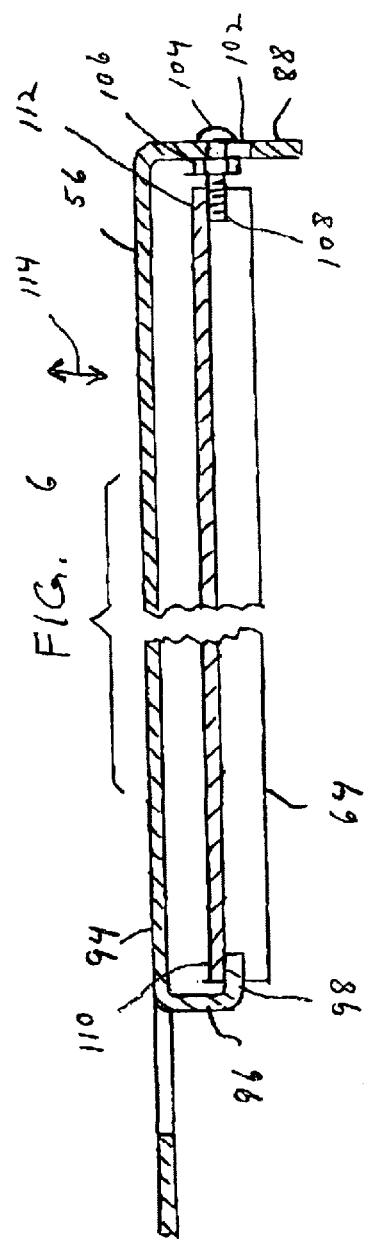

ALIGNMENT DOCKING SYSTEM

BACKGROUND OF THE INVENTION

1. Field of the Invention

The present invention relates to an electronic component connection system and, more particularly, to a docking system for a printed circuit card.

2. Brief Description of Prior Developments

U.S. Pat. No. 6,198,633 B1 discloses a computer system with a backplane having electrical connectors and guide rails for slidably attaching adapters into connection with the backplane connectors. Many different types of systems for connecting printed circuit cards with electrical connectors on backplane motherboards are also known. A potential problem exists when connecting a printed circuit card to an electrical connector on a backplane. Specifically, a mating electrical connector on the printed circuit card must be properly aligned with the electrical connector on the backplane in order for the two electrical connectors to be properly connected to each other. If the two electrical connectors are not properly aligned with each other, the misalignment can prevent the printed circuit card from being fully inserted into the receiving component and can prevent the electrical connectors from being operationally connected to each other.

One type of printed circuit card has a plurality of daughter board card edge connectors and a backplane electrical connector for removable connection of the printed circuit card and attached daughter boards with a backplane as a single unit. However, a guiding system must be provided to accommodate a relatively long length of insertion and removal (to accommodate relatively long daughter printed circuit boards), but still provide connector alignment at the backplane electrical connectors without exorbitant manufacturing costs associated with high manufacturing tolerances. There is a desire to provide a card docking system with an improved backplane electrical connector alignment, but without exorbitant manufacturing costs.

SUMMARY OF THE INVENTION

In accordance with one aspect of the present invention, a system is provided for connecting a first electrical connector on a printed circuit card with a second electrical connector. The system includes a support member having the printed circuit board connected thereto; a movement device allowing the support member to move in a first direction relative to the second connector; and a float connection between the movement device and the support member allowing the support member to move in a second direction relative to the second connector. The second direction is angled relative to the first direction. The float connection allows the first connector to align with the second connector as the support member is moved in the first direction and the first and second connectors are being connected to each other.

In accordance with another aspect of the present invention, an electronic apparatus is provided comprising a housing; an electrical connector connected to the housing; a printed circuit board removably connectable to the electrical connector; a tray having the printed circuit board connected thereto, the tray having at least one slide mounting tab and a front flange; and at least one slide having a first member connected to the tray by a float connection comprising the at least one tab and a fastener extending through the front flange to allow a float movement between the first member and the tray, and a second member connected to the housing and movably connected to the first member. The at least one slide allows the tray to move relative to the housing to connect and disconnect the printed circuit board with the connector. The float connection allows the tray to move to allow the printed circuit board to align with the electrical connector when being connected thereto.

In accordance with another aspect of the present invention, a system is provided for movably connecting a printed circuit board to a frame. The system comprises a tray having the printed circuit board connected thereto; means for sliding the tray relative to a portion of the frame in a first direction, the means for sliding including at least one slide mechanism with at least two rails connected to each other for telescoping relative movement; and means for allowing the tray to move relative to the frame in a second direction angled relative to the first direction. The means for allowing the tray to move relative to the frame comprising a floating connection between the at least one slide and the tray.

BRIEF DESCRIPTION OF THE DRAWINGS

The foregoing aspects and other features of the present invention are explained in the following description, taken in connection with the accompanying drawings, wherein:

FIG. 3 is a perspective view from a bottom side of components of the subassembly shown in FIG. 2;

FIG. 4 is a partial cross sectional view of the components shown in FIG. 3;

FIG. 6 is a cross sectional view showing the attachment of the upper rail of the slide shown in FIG. 5 to the tray of the subassembly shown in FIG. 3.

DETAILED DESCRIPTION OF THE PREFERRED EMBODIMENT

Figure 1:
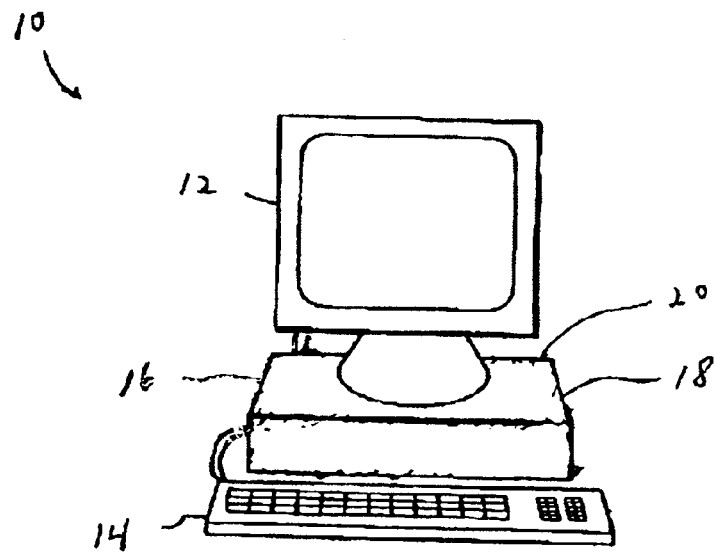
FIG. 1 is a front view of an electronic apparatus incorporating features of the present invention.

Referring to FIG. 1, there is shown a front view of an electronic apparatus 10 incorporating features of the present invention. Although the present invention will be described with reference to the exemplary embodiment shown in the drawings, it should be understood that the present invention can be embodied in many alternate forms of embodiments. In addition, any suitable size, shape or type of elements or materials could be used.

The electronic apparatus 10 in the embodiment shown comprises a computer system, such as a desktop personal computer (PC). The electronic apparatus 10 comprises a display 12, a keyboard 14, and a main unit 16. In an alternate embodiment, features of the present invention could be used and other types of electronic apparatus or other types of computers. For example, the present invention could be used in a computer server or a rack computer system, such as a system where the subassembly 15 (described below) slides out of the front of the system. The display 12 and keyboard 14 are generally knows in the art. The main unit 16 comprises a housing 18 and electronic circuitry and components housed within the housing 18. The rear end 20 of the housing 18 forms a I/O connection area for connecting components, such as the display 12, keyboard 14, and other standard connections. For example, other standard connections can include a telephone line, a network connection, an Internet connection, speakers, a printer, etc.

Figure 2:
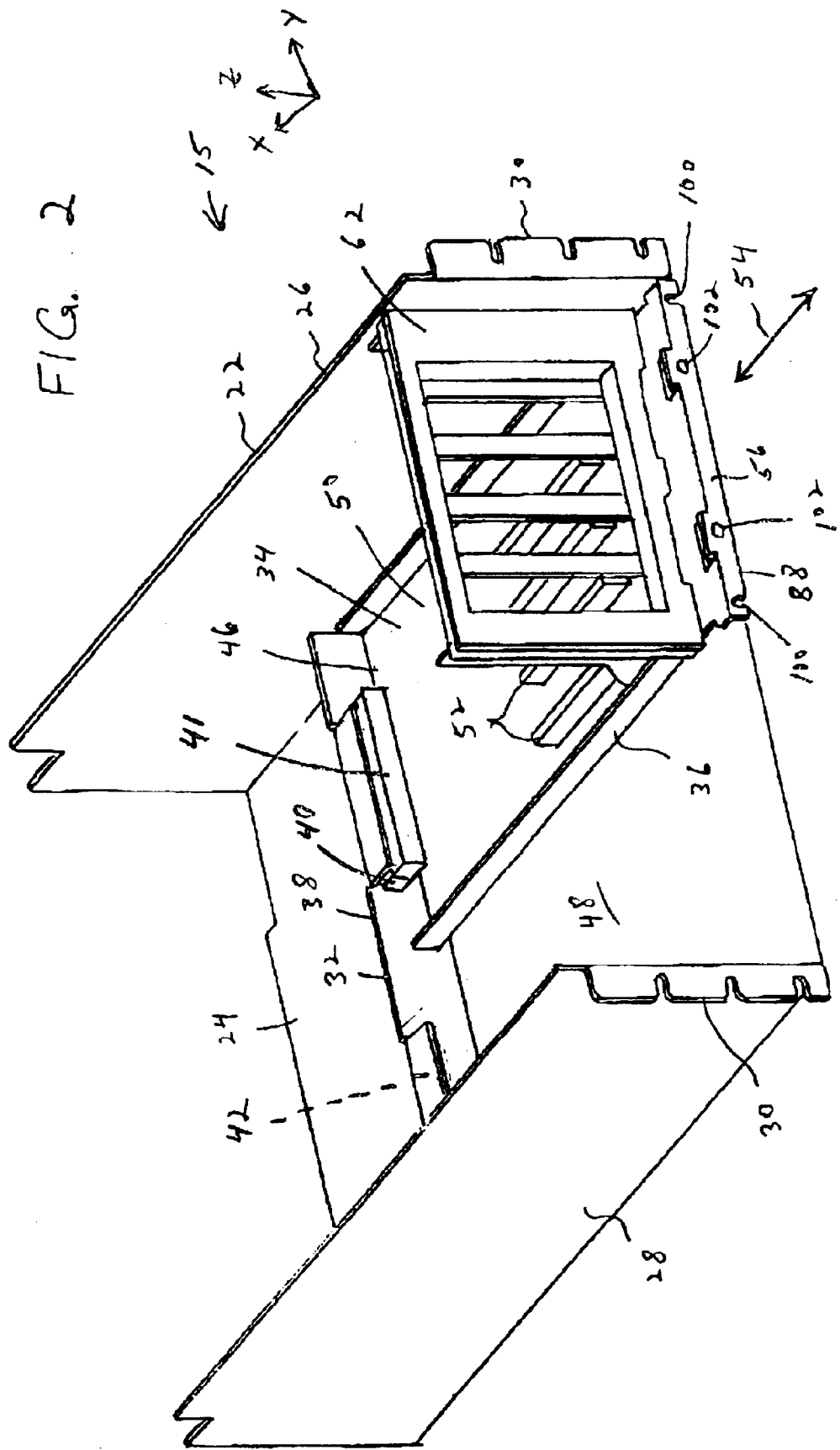
FIG. 2 is a perspective view of a subassembly of the main unit of the electronic apparatus shown in FIG. 1.

Referring also to FIG. 2, a subassembly 15 of the main unit 16 is shown. The subassembly 15 generally comprises a frame member 22, a first printed circuit board assembly 32, a second printed circuit board assembly 34, and a system 36 for movably connecting the second printed circuit board assembly 34 to the frame member 22. The frame member 22 generally forms a host bay chassis. The frame member 22 is preferably comprised of metal, such as sheet metal. The frame member 22 could form a portion of the housing 18. In the embodiment shown, the frame member 22 comprises a bottom section 24 and two side sections 26, 28. The side sections 26, 28 include outwardly extending flanges 30 for fixedly attaching the frame member 22 to the rest of the housing 18 at the rear end 20, such as by fasteners (not shown). The frame member 22 is adapted to be located inside an outer casing of the housing 18. However, in an alternate embodiment, the frame member 22 could form the exterior bottom and/or lateral sides of the housing 18.

Referring also to FIG. 3, the first printed circuit board assembly 32 can form a power distribution card. The first printed circuit board assembly 32 generally comprises a printed circuit board 38 and two electrical connectors 40, 42. The printed circuit board 38 is fixedly attached to the frame member 22 between the two side sections 26, 28. In an alternate embodiment, the printed circuit boards 38 could be attached to the frame member 22 by any suitable means or location. The printed circuit board 38 electrically connects the two electrical connectors 40, 42 to each other, and is connected to conductors 44 (only some of which are shown) to electrically connect the two electrical connectors 40, 42 to other components inside the main unit 16. In an alternate embodiment, the first printed circuit board assembly 32 could merely comprise a support frame with the two electrical connectors 40, 42 attached thereto; rather than having the member 38 as a printed circuit board.

The electrical connectors 40, 42 are standard types of electrical connectors generally well known in the art. The electrical connectors 40, 42 can function as both power connectors and signal connectors, or alternatively, merely power connectors. The first electrical connector 40 can comprise at electrical connector, such as a back panel or docking connector, adapted to make electrical connection with a mating electrical connector 41 mounted to the end 46 of the second printed circuit board assembly 34. Alternatively, the first electrical connector 40 can comprise a card edge connector adapted to make electrical connection with a card edge connection section located on the end 46 of the second printed circuit board assembly 34. The second electrical connector 42 can be used to make electrical connection with one or more additional components (not shown) positioned in the area 48 located to the lateral side of the second printed circuit board assembly 34. In an alternate embodiment, the apparatus 10 could comprise a second one of the systems 36 with any suitable type of components mounted thereto.

Referring also to FIG. 4, the second printed circuit board assembly 34 generally comprises a second printed circuit board 50, and a plurality of electrical connectors 52. The second printed circuit board 50 forms a host planner card. In a preferred embodiment, the host planner card has an Elcon™ docking connector at the end of the card that docks into the power distribution card 32 in the host bay chassis 22. In the embodiment shown, the electrical connectors 52 comprise card edge connectors mounted to a top side of the second printed circuit board 50. However, in alternate embodiments, the electrical connectors 52 could comprise any suitable type of electrical connectors. Although the second printed circuit board assembly 34 is shown with four of the electrical connectors 52, the second printed circuit board assembly 34 could comprise more or less than tour of the electrical connectors 52. The electrical connectors 52 could comprise more than one type of electrical connector, such as PCI connectors and EISAbus connectors for example.

The system 36 for movably connecting the second printed circuit board assembly 34 to the frame member 22 is adapted to movably attach the second printed circuit board assembly 34 for movement along a path as indicated by arrow 54. The system 36 functions similar to a drawer which allows the second printed circuit board assembly 34 to be slid into and out of the rear end 20 of the housing 18. As the system 36 slides the second printed circuit board assembly 34 into the fully inserted position shown in FIG. 2, the end 46 of the assembly 34 makes a removable electrical connection with the first electrical connector 40.

Figure 5:
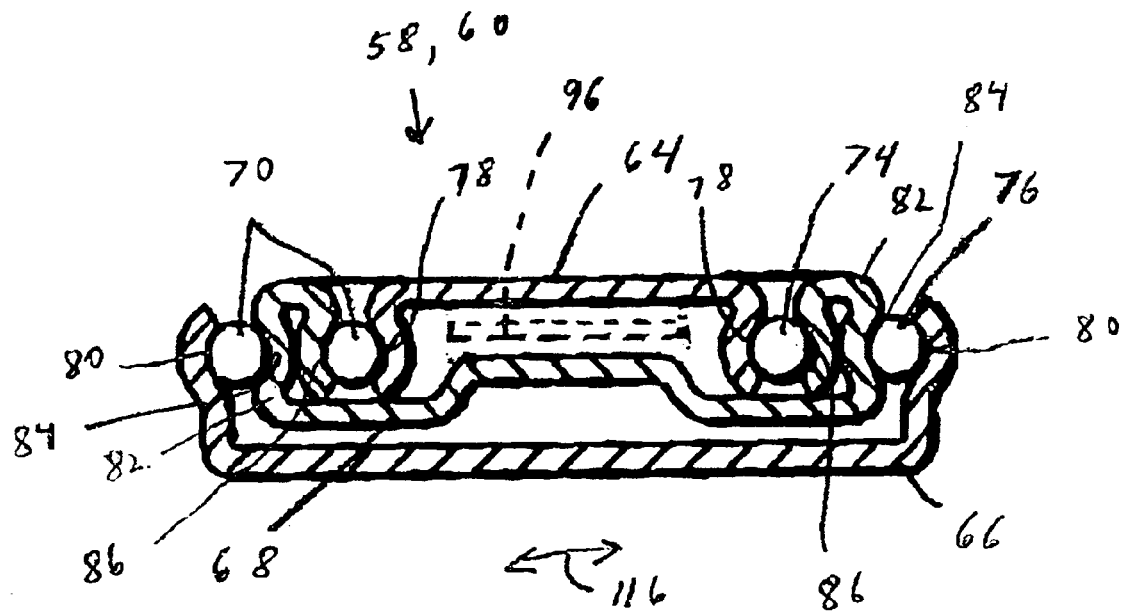
FIG. 5 is a cross sectional view of one of the slide mechanisms shown in FIG. 4.

The system 36 generally comprises a tray 56, slides or slide mechanisms 58, 60, and a rear side frame 62. The rear side frame 62 is stationarily attached to the tray 56 at the top rear of the tray. The rear side frame 62 has apertures therethrough and is adapted to connect mounting frame sections of the daughter printed circuit board assemblies thereto as is generally known in the art. The two slides 58, 60 are identical to each other. However, in an alternate embodiment, more or less than two slides could be provided and/or the slides could be different from each other. Referring also to FIG. 5, each slide 58, 60 generally comprises a first member 64, a second member 66, a third member 68, and bearings 70. The members 64, 66, 68 form rails or the slides. The first, second and third members are preferably comprised of sheet metal which has been bent and formed into the shapes shown. However, in alternate embodiments, any suitable materials or manufacturing methods could be used. The first member 64 is connected to the tray 56 at the bottom side 72 of the tray. The second member 66 is stationarily attached to the top side of the frame member 22 on the bottom section 24. The third member 68 is connected between the first and second members 64, 66 by the bearings 70.

The bearings 70 comprise a first set 74 of the bearings located in races of the first member 64 and the third member 68, and a second set 76 of the bearings located in races of the second member 66 and the third member 68. The first number 64 comprises a general upside-down U shape with outward facing races 78 on its downward extending legs. The second member 66 to comprises a U shape with inward facing races 80 on the inward sides of its legs. The third member 68 is located between the first and second members 64, 66. The third member 68 has a middle section and two upwardly extending outer side sections 82. The side sections 82 comprise bent around or folded over portions. Each side section 82 forms an outer race 84 and an inner race 86.

With this embodiment, even though the second member 66 is stationarily connected to the frame member 22, the first member 64 and the third member 6 can be slid or rolled on the bearings 70 in a general telescoping manner. In an alternate embodiment, the slides 58, 60 might comprise only the first member 64 and the second member 66 directly movably connected to each other by bearings without the third member 68. However, the third member 68 is preferred because it increases the outward telescoping distance which the system 36 provides. The outward telescoping distance is preferably large enough to accommodate inserting and removing daughter circuit boards into the card edge connectors 52 with the second printed circuit board 50 substantially entirely moved out of the rear end 20. In an alternate embodiment, any suitable type of slide or rail system could be provided. In a preferred embodiment, the slides 58, 60 can provide a movement of about 17 inches.

FIG. 3 shows the second slide 60 connected to the bottom side of the tray 56 and only the first member 64 of the first slide 58 shown attached to the bottom side of the tray, the bearings 70 and the second and third members 66, 68 being removed for the sake of clarity only. Referring also to FIG. 6, the tray 56 generally comprises a substantially flat center section 94, upstanding lateral side sections 90, 92, an end flange 88, and mounting tabs 96. The tray 56 comprises two of the mounting tabs 96; one tab for each of the slides 58, 60. As seen with reference to FIGS. 2 and 3, the flat center section 94 comprises stamped standoff sections 118. The bottom side of the second printed circuit board 50 is located against the top side of the standoff sections 118. Fasteners (not shown) stationarily attach the printed circuit board 50 to the standoff sections 118. The tray 56 functions as a support member for the second printed circuit board. The tabs 96 have a general L shape and extend down from the center section 94 and towards the end flange 88. The bottom of the tab 96 forms a support lip 98. The end flange 88 comprises two sets of holes or slots therethrough. The first set of slots 100 are adapted to receive fasteners (not shown) for stationarily connecting the tray 56 to the frame member 22. The fasteners are preferably removable fasteners, such as screws, to allow the tray 56 to be movable when the fasteners are removed. The second set of holes 102 are adapted to receive fasteners 104. The fasteners 104 are fixedly attached to the flange 88 by nuts 106. Ends 108 of the fasteners 104 extend past the flange 88.

Referring particularly to FIGS. 3 and 6, the first member 64 has an upward extending bottom channel at the rear and front portions of the first member. The mounting tab and the fastener are located in the bottom channel. An end 110 of the first member 64 is located above the support lip 98. The opposite end 112 of the first member 64 is located above the end 108 of the fastener 104. Thus, the first member 64 is effectively captured between the tab 96 at its end 110 and the fastener 104 and tray 56 at its end 112. The first member 64 moves with the tray 56 when the tray is slid inward and outward as indicated by arrow 54. The use of the fasteners 104 allows the first member 64 to be positioned at the bottom side of the tray 56 and the fastener 104 subsequently connected to the tray to capture the first member 64 with the tray. However, in alternate embodiments, any suitable type of fasteners or connectors could be used.

The capture of the first member 64 with the tray 56 is a movable or floating capture. More specifically, the connections of the slides 58, 60 to the tray 56 form float connections. More specifically, the tray 56 can move vertically relative to the first member 64 as indicated by arrow 114. The amount of vertical movement 114 is limited by the space between the top of the support lip 98 and the bottom side of the center section 94, and the top side of the end 108 and the bottom side of the center section 94. As shown in FIG. 5, the width of the mounting tabs 96, in the embodiment shown, is smaller than the width between the downward extending legs of the first member 64. The tray 56 can move laterally relative to the first members 64 as indicated by arrow 116. The amount of lateral movement is limited by the open spaces between the tabs 96 and the downward extending legs of the first member 64. With the present invention, the tray 56 is able to move slightly vertically and slightly laterally relative to the slides 58, 60. This allows the second printed circuit board assembly 34 to move slightly vertically and laterally relative to the frame 22 and first printed circuit board assembly 32. Thus, when the second printed circuit board assembly 34 is being connected to the first printed circuit board assembly 32, the end 46 can move in Y and Z directions to allow proper connection with the first electrical connector 40. The present invention allows the second printed circuit board assembly 34 to align with the first electrical connector 40 in order to ensure a proper electrical connection which is not misaligned. The connection of the second printed circuit board assembly 34 with the first electrical connector 40 can be self-aligning.

With the present invention, the tray 56 can be slid in a outward direction with the second printed circuit board assembly 34 and the rear side frame 62, as well as any daughter printed circuit board assemblies attached to the electrical connectors 52. When the tray 56 is moved to its outward position, daughter printed circuit board assemblies can be connected or disconnected from the second printed circuit board assembly 34. The tray 56 can then be moved back to its inward position as shown in FIG. 2 with the second printed circuit board assembly 34 making electrical connection with the first electrical connector 40 and, thus, electrically connecting the daughter printed circuit board assemblies to the first electrical connector 40. The tray 56 is able to effectively float in the Y and Z directions (i.e., directions 114 and 116). The tray 56 is also able to float in the X direction slightly. The system 36 provides both a drawer type of movement system as well as a card alignment docking system for docking with the electrical connector 40. The present invention can provide a floating system, and depending on the placement and size of the tabs in the tray and the location of the fasteners, it can have more or less float. Unlike a conventional slide having an inner member, a middle member and an outer member with the inner and outer members being stationarily connected to components by screws, the inner member of the present invention is adjustably or movably captured by tabs on the tray and horizontal screws in the front 90 degree flange on the end of the tray; not attached by screws to the tray. This allows for automatic alignment when connecting to the connector 40.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. An electronic apparatus comprising:

a housing;

an electrical connector connected to the housing;

a printed circuit board removably connectable to the electrical connector;

a tray having the printed circuit board connected thereto, the tray having at least one slide mounting tab and a flange;

at least one slide having a first member connected to the tray underneath the tray by a float connection comprising the at least one tab and a fastener extending through the flange to allow a float movement between the first member and the tray, and a second member connected to the housing and movably connected to the first member, wherein the at least one slide allows the tray to move relative to the housing to connect and disconnect the printed circuit board with the connector, and wherein the float connection allows the tray to move to allow the printed circuit board to align with the electrical connector when being connected thereto.

2. An electronic apparatus as in claim 1 further comprising a power backplane having the electrical connector connected thereto, and wherein the printed circuit board comprises a mating electrical connector.

3. An electronic apparatus as in claim 1 wherein the electronic apparatus comprises two of the slides located parallel to each other, each slide providing a telescoping movement of the first and second members of the slides relative to each other.

4. An electronic apparatus as in claim 1 wherein the mounting tab extends downward from a bottom side of the tray and has a general L shape.

5. A system for movably connecting a printed circuit board to a frame, the system comprising:
- a tray having the printed circuit board connected thereto;
- at least one slide mechanism with at least two rails connected to each other for telescoping relative movement;
- a floating connection between the at least one slide mechanism and the tray to allow the tray to move relative to the at least one slide mechanism and wherein at least one of the rails of the at least one slide mechanism is connected to the tray underneath the tray.

6. A system as in claim 5 further comprising means for sliding the tray relative to a portion of the frame in a first direction, the means for sliding including the at least one slide mechanism.

7. A system as in claim 5 further comprising means for allowing the tray to move relative to the frame in a second direction angled relative to a first direction, the means for allowing the tray to move relative to the frame comprising the floating connection between the at least one slide and the tray.

8. A system as in claim 7 wherein the float connection is adapted to allow the tray to move relative to the frame in a third direction angled relative to the first and second directions.

9. A system as in claim 5 wherein the at least one slide mechanism includes two of the slide mechanisms.

10. A system as in claim 5 wherein the at least one slide mechanism comprises bearings located between the at least two rails.

11. A system as in claim 5 wherein the at least one slide mechanism comprises three of the rails.

12. A system as in claim 5 wherein the float connection comprises a tab extending from the tray and located beneath a first one of the rails, and a fastener attached to the tray and located beneath the first rail.

13. A system for connecting a first electrical connector on a printed circuit board with a second electrical connector, the system comprising:
- a support member having the printed circuit board connected thereto;
- a movement device allowing the support member to move in a first direction relative to the second connector; and
- a float connection between the movement device and the support member allowing the support member to move in a second direction relative to the second connector, wherein the second direction is angled relative to the first direction, and wherein the float connection allows the first connector to align with the second connector as the support member is moved in the first direction and the first and second connectors are being connected to each other, and wherein the movement device comprises at least one slide, the at least one slide comprising a first member movably connected to a second member, said first member is connected to the support member underneath the support member.

14. A system as in claim 13 wherein the support member comprises a tray having the printed circuit board mounted to a top side of the tray.

15. A system as in claim 13 wherein the first member is movably connected to the second member in a general telescoping arrangement.

16. A system as in claim 13 wherein the float connection comprises a tab extending from the support member and a fastener attached to the support member, and wherein the first member of the movement device has opposite ends which are loosely captured between the fastener and tab and the support member.

17. A system as in claim 16 wherein the movement device comprises the first member having an upward extending bottom channel at rear and front portions of the first member, and wherein the mounting tab and the fastener are located in the bottom channel.

18. An electronic apparatus comprising:
- a housing;
- a printed circuit board having a first electrical connector;
- a second electrical connector connected to the housing, the second electrical connector being adapted to make it the first electrical connector; and
- a system as in claim 13 for connecting the first electrical connector on the printed circuit board with the second electrical connector.

19. An electronic apparatus as in claim 18 wherein the float connection comprises a tab extending from the support member and a fastener attached to the support member, and wherein a first member of the movement device has opposite ends which are loosely captured between the fastener and tab and the support member.

20. An electronic apparatus as in claim 19 wherein the movement device comprises the first member having an upward extending bottom channel at rear and front portions of the first member, and wherein the mounting tab and the fastener are located in the bottom channel.

* * * * *